United States Patent [19]

Romanato et al.

[11] Patent Number: 5,727,271
[45] Date of Patent: Mar. 17, 1998

[54] METHOD FOR OBTAINING A SHOE

[75] Inventors: Mariarosa Romanato, Stra; Franco Priarollo, Cornuda; Riccardo Perotto, Volpago del Montello, all of Italy

[73] Assignee: Nordica S.p.A., Trevignano, Italy

[21] Appl. No.: 654,496

[22] Filed: May 28, 1996

[30] Foreign Application Priority Data

May 30, 1995 [IT] Italy .................. TV95A0062

[51] Int. Cl.⁶ ..................... A43D 9/00; A43B 13/14
[52] U.S. Cl. ................. 12/142 RS; 12/142 E; 36/14
[58] Field of Search ............. 12/142 E, 142 RS, 12/142 F, 142 T; 36/14

[56] References Cited

U.S. PATENT DOCUMENTS

| | | | |
|---|---|---|---|
| 1,716,790 | 6/1929 | Mitchell | 36/59 R |
| 2,306,306 | 12/1942 | Ferrettie | 36/4 |
| 2,317,880 | 4/1943 | Bingham, Jr. | 12/142 E X |
| 2,403,442 | 7/1946 | Klaus | 36/14 X |
| 3,099,885 | 8/1963 | Jordan et al. | 36/59 R |
| 4,255,825 | 3/1981 | Rigon | 12/142 RS |
| 4,364,190 | 12/1982 | Yonkers | 36/59 C X |
| 4,706,316 | 11/1987 | Tanzi . | |
| 5,038,500 | 8/1991 | Nicholson | 36/59 R X |

FOREIGN PATENT DOCUMENTS

| | | | |
|---|---|---|---|
| 0018663 | 11/1980 | European Pat. Off. . | |
| 0347346 | 12/1989 | European Pat. Off. . | |
| 1350139 | 4/1964 | France . | |
| 2208279 | 6/1974 | France . | |
| 4129361 | 7/1992 | Germany | 12/142 RS |
| 5253004 | 10/1993 | Japan | 12/142 RS |
| 406030809 | 2/1994 | Japan | 12/142 E |
| 191834 | 9/1937 | Switzerland | 12/142 E |
| 9415493 | 7/1994 | WIPO . | |

OTHER PUBLICATIONS

Patent Abstracts of Japan–vol. 14 No. 314 (C–737), 5 Jul. 1990 & JP-A-02 109502 (Moon Star Co.) 23 Apr. 1990–*abstract*.

*Primary Examiner*—Ted Kavanaugh
*Attorney, Agent, or Firm*—Guido Modiano; Albert Josif

[57] ABSTRACT

The method for obtaining a shoe entails the execution of a nonrigid sock or upper, which is tensioned by means of an adapted last to allow the coupling thereto of an intermediate member on which multiple through holes are formed and which has an optional cavity at the arch region. Then the intermediate member is placed inside a mold and at least one first injection or pouring of preferably but not necessarily compact thermoplastic or thermosetting or expandable material is performed, so as to affect at least the intermediate structural element to obtain a semifinished item below which a sole is associable.

20 Claims, 6 Drawing Sheets

METHOD FOR OBTAINING A SHOE

BACKGROUND OF THE INVENTION

The present invention relates to a method for obtaining a shoe and to a shoe obtained with said method.

Conventional sports shoes, for example for mountaineering, are produced by using a nonrigid sock to which an upper, open at the bottom, is coupled perimetrically and in an upward region by stitching. The upper is in fact subsequently placed at a last, and its ends are turned over on an adapted insole and are stitched or glued thereto to obtain a closed configuration that is adapted to fully surround the nonrigid sock. A sole provided with a tread is then coupled below the upper by injection-molding or stitching.

EP 0 152 783 discloses a flat sole that has a box-like shape in the region of the toe and a counter in the heel region; these parts are connected by lateral walls and the sole comprises selective support means that are associated with the sole and are adapted to vary its flexibility. The sole and its components are then stitched or glued to the upper.

U.S. Pat. No. 4,706,316 discloses a method for producing shoes that entails, in this case too, the production of separate components that can be mutually associated to obtain the upper, to which a sole is subsequently glued.

Both of the described solutions in any case have a member that is provided with counters for the heel and for the toe and is stitched or glued to the upper together with the other components of the shoe.

This conventional method allows a simplified assembly, because the unit constituted by the member and by the nonrigid sock acts as a semifinished item on which various components are then fitted. Several manual stages are, however, still required.

This conventional method also entails stitches or gluing operations for mutually associating the various components.

Furthermore, the manual nature of the described operations does not ensure constant quality of the finished product, since this depends on the skill of the operator.

It is also noted that the external stitches considerably reduce the waterproofing of the shoe.

Furthermore, the cost of the assembly operations is high, and this accordingly causes a high cost of the finished product.

FR-2208279 discloses a method for manufacturing a shoe including molding a plastic material on a semifinished item constituted by an upper connected to a sole member. A problem connected with this method is that the upper has to be firmly associated with the sole member before molding.

SUMMARY OF THE INVENTION

The aim of the present invention is to solve the described technical problems, eliminating the drawbacks of the mentioned prior art by providing a highly industrializable method that accordingly allows to obtain a shoe while limiting the number of manual assembly stages.

Within the scope of the above aim, an important object is to provide a method that allows to drastically reduce the quantity and areas affected by stitches.

Another important object is to provide a method that allows to obtain shoes that have a high and constant quality.

Another important object is to provide a method that allows to obtain shoes that have excellent waterproof and comfort characteristics for the user.

Another object is to provide a shoe that is reliable and safe in use and can be obtained with ordinary machines and facilities.

This aim, these objects, and others which will become apparent hereinafter are achieved by a method for producing a shoe characterized in that it comprises the following steps:

a) arranging an upper on a last and tensioning said upper;

b) dry coupling said upper to an intermediate member constituted by a toe portion and by a heel portion connected by a central portion;

c) arranging said intermediate member into a mold and either casting or injection-molding a plastic material into said mold to produce a semifinished item;

d) coupling a sole member to said semifinished item.

BRIEF DESCRIPTION OF THE DRAWINGS

Further characteristics and advantages will become apparent from the detailed description of a particular but not exclusive embodiment, illustrated only by way of non-limitative example in the accompanying drawings, wherein.

DESCRIPTION OF THE PREFERRED EMBODIMENTS

Figure 1:
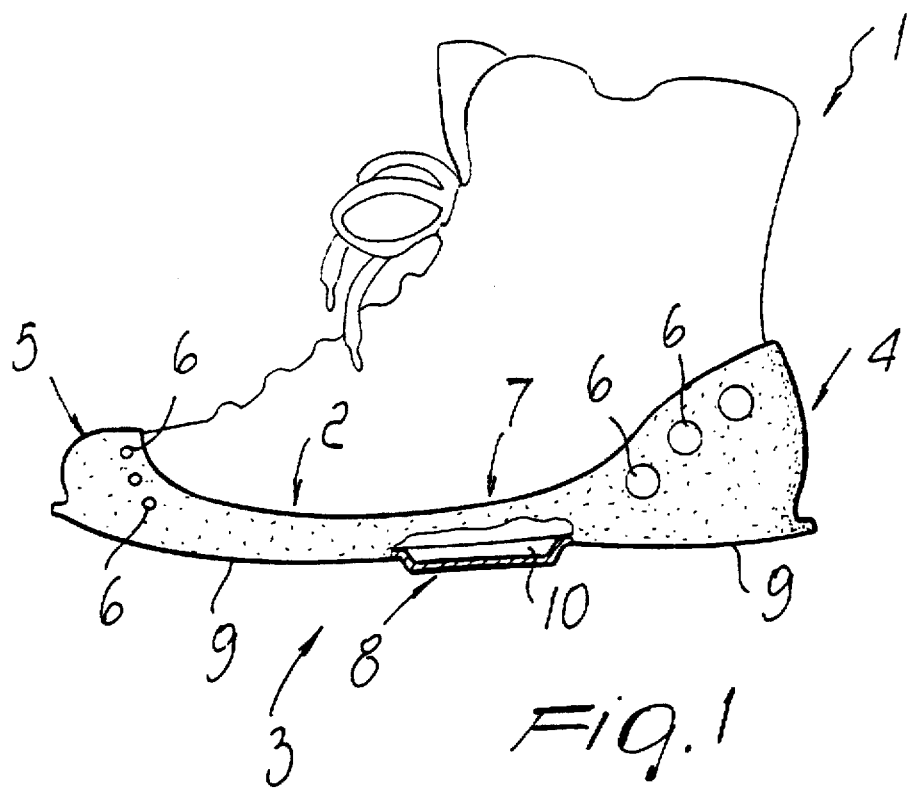
FIG. 1 is a side view of the nonrigid sock, with which the intermediate member is associated.

With reference to the above figures, a nonrigid sock or an upper, generally designated by the reference numeral 1, has an adapted insole, not shown, and an upper externally associated. The nonrigid sock or upper thus forms an upper-insole assembly 1.

The nonrigid sock or upper 1 is then arranged inside an adapted last, not shown, to tension the upper so as to achieve good adhesion perimetrically with respect to the last.

Then, an intermediate member 2 is dry-coupled to the nonrigid sock or upper 1 and affects the lower region 3 of the upper as well as the heel region 4 and/or the toe region 5, which are connected to each other.

A plurality of first holes 6 are formed at the lateral surface of intermediate member 2. The holes are preferably formed at the heel region 4 and at the toe region 5.

Intermediate member 2 can also have, at the plantar arch region 7, a protrusion 8 that protrudes beyond the lower edge 9 of intermediate member 2. Protrusion 8 forms a cavity 10.

The method then entails placing the intermediate member 2 inside a mold and performing at least one first injection or casting of preferably but not necessarily compact thermoplastic or thermosetting or expandable material, such as single- or multiple-component polyurethane, which overlaps at least at the intermediate member 2.

In a preferred embodiment it is used a bi-component expandable polyurethane injected and subsequently expanded inside the mold.

Figure 2:
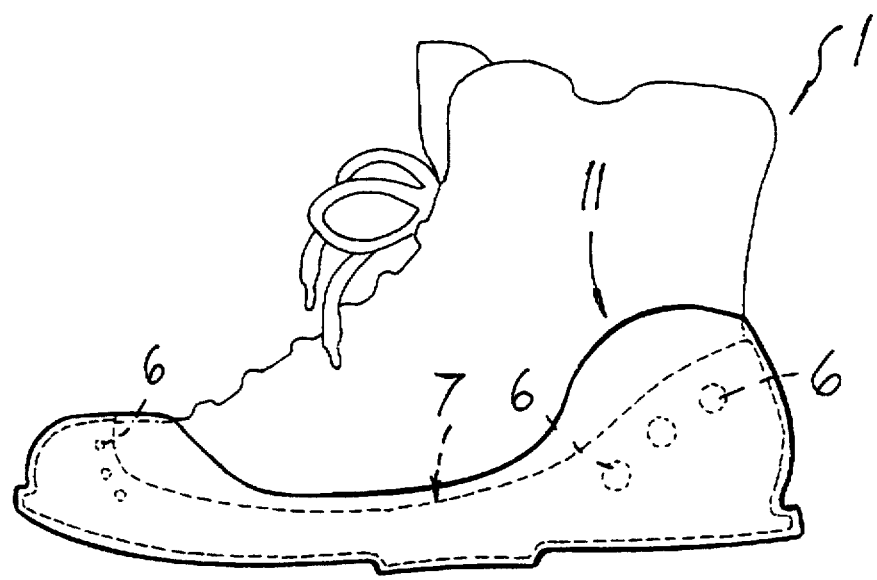
FIG. 2 is a view, similar to the preceding one, of the semifinished item.

A semifinished item is thus produced, generally designated by the reference numeral 11, in which an optimum coupling to the nonrigid sock or upper 1 is achieved, since the thermosetting or thermoplastic or expandable material has penetrated at the holes 6 formed on the intermediate member 2, also, as shown in FIG. 2, affecting part of the surface that is adjacent to the heel region 4 and the toe region 5 of said nonrigid sock or upper 1.

The semifinished item 11 thus obtained has no stitches of any kind, forming a waterproof barrier in the lateral and lower regions of the nonrigid sock or upper 1 and thus in areas that are in direct contact with water during walking.

Figure 3:
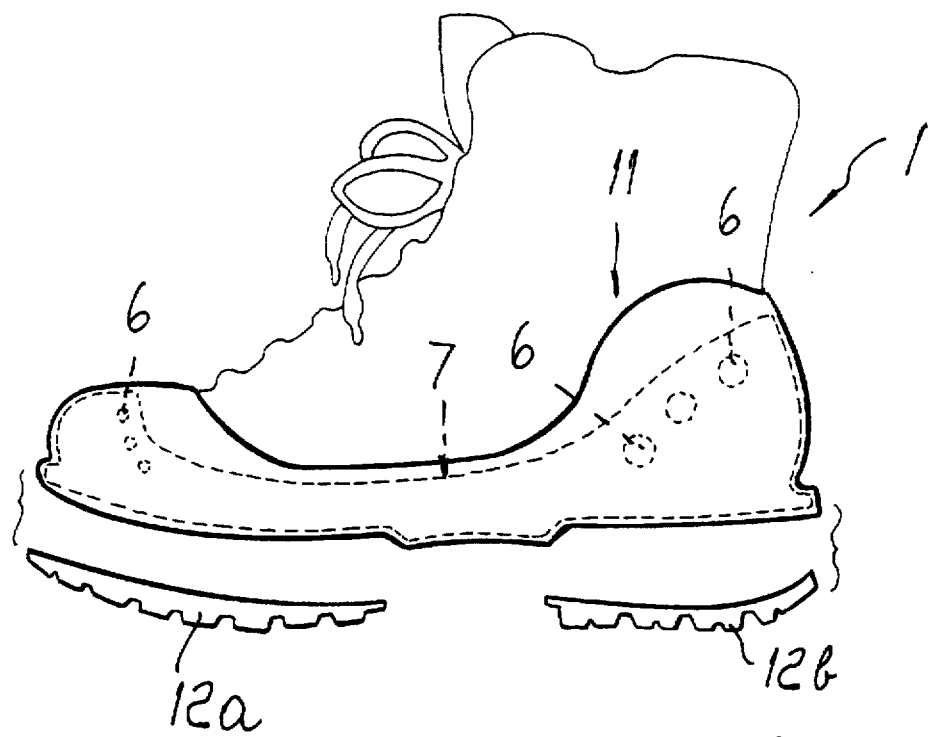
FIG. 3 is a view, similar to the preceding one, of the application, below the semifinished item, of a sole that is constituted by two treads that are associated in the heel and metatarsal region of the semifinished item.
Figure 4:
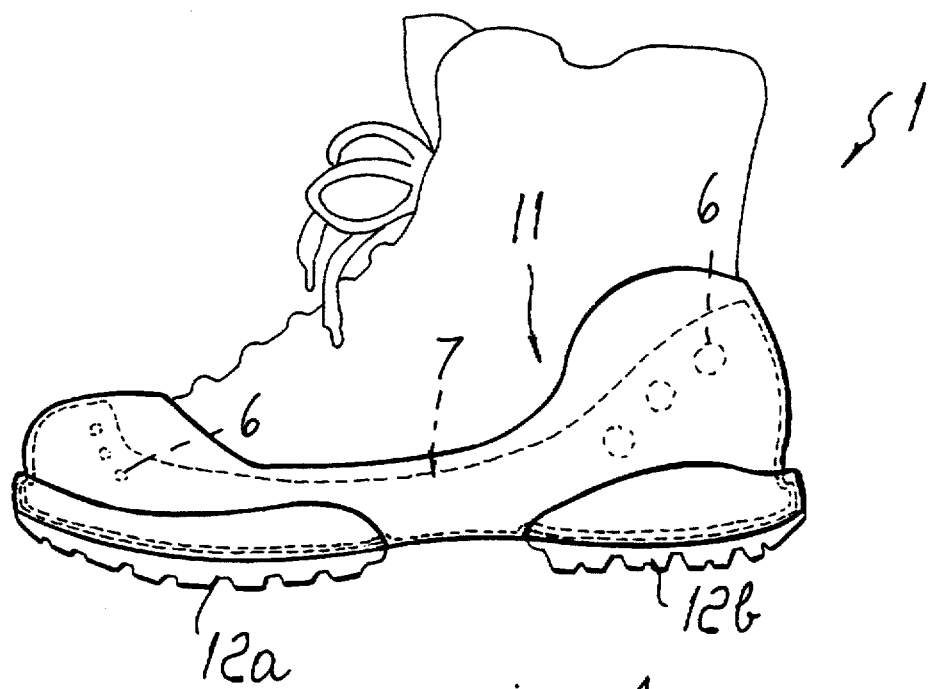
FIG. 4 is a side view of the shoe obtained according to the invention.

A sole or any other sole member, such as a roller skate for example, can be coupled below the semifinished item 11, by means of conventional methods, such as gluing, or by means of the same or of a second injection of foamed thermoplastic material or of expandable material, as better explained hereinafter; in the particular solution shown in FIG. 3, said sole is constituted by two treads 12a and 12b that are coupled at the heel and toe regions.

To increase user comfort, one or more blocks, having the desired flexibility characteristics, may be inserted in cavity 10.

It has thus been observed that the invention has achieved the intended aim and objects, since it allows greater industrialization for the production of the shoe, limiting the number of manual assembly stages and limiting the stitches only to the nonrigid sock or upper or, possibly, only to the coupling of the upper to the nonrigid sock; moreover, this occurs in regions that are not in direct contact with, or in the vicinity of, the ground during walking.

Optimum waterproofing of the shoe is therefore also allowed, whereas the possibility of inserting adapted inserts in the cavity 10 allows to further improve user comfort. The inserts in fact act as shock-absorbing elements in a particularly sensitive region such as the plantar arch region.

An important feature of the method according to the invention is that intermediate member 2 can be coupled to the upper without glue or any other means because its particular shape allows it to remain in position, during the injection-molding.

The method is of course susceptible of numerous modifications and variations, all of which are within the scope of the same inventive concept.

Figure 5:
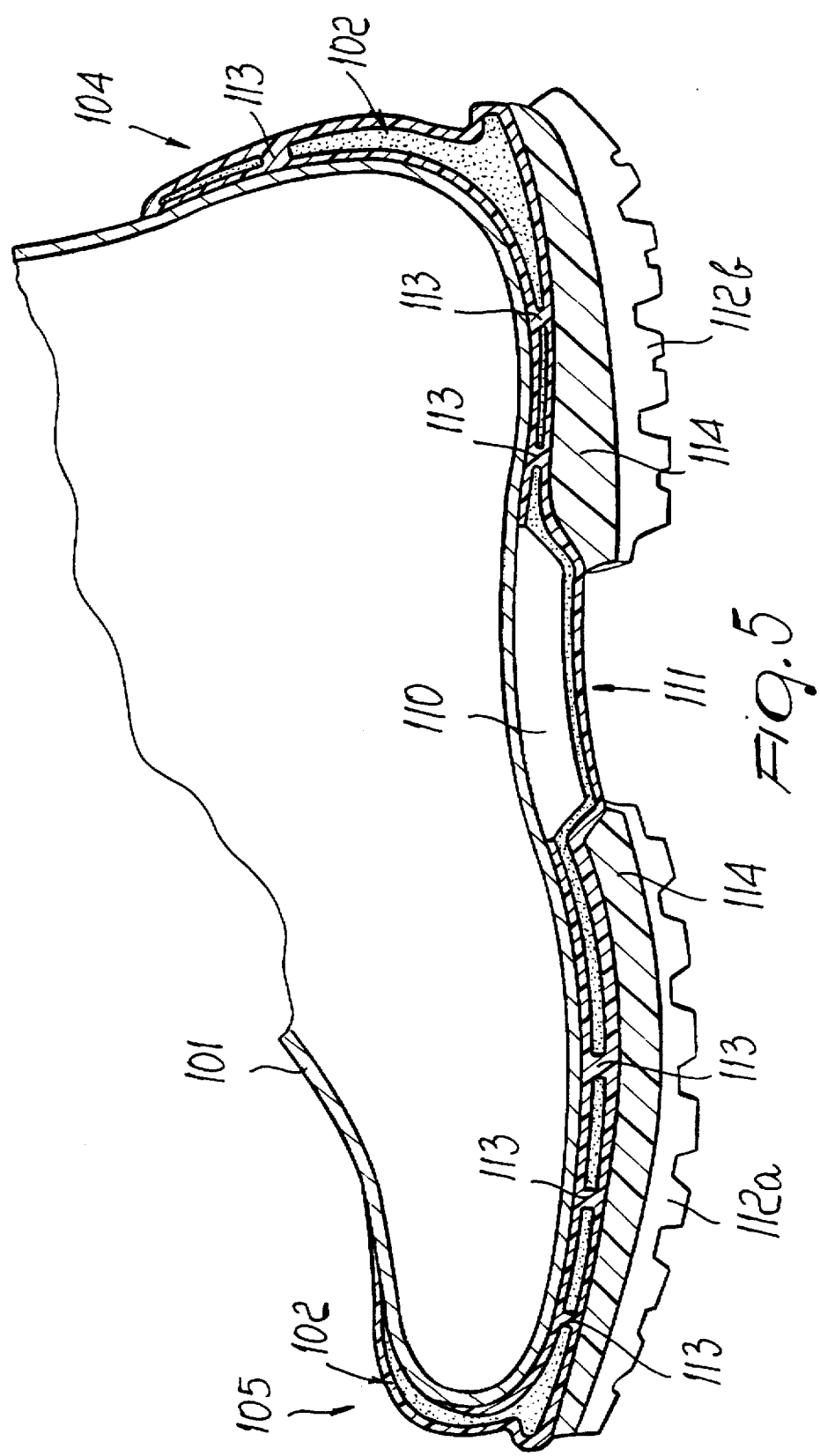
FIG. 5 is a side sectional view, taken along the longitudinal median plane of the shoe according to a further aspect of the invention.

Thus, for example, FIG. 5 illustrates a nonrigid sock or upper 101 that is dry-coupled to an intermediate member 102 provided with adapted second holes 113 that are formed at the region of the sole of the foot and optionally at the heel region 104 and at the toe region 105.

In this embodiment, the intermediate member 102 thus obtained is placed inside a mold to perform a first injection or pouring of preferably but not necessarily compact thermoplastic or thermosetting or expandable material that affects at least said intermediate member 102 and therefore, in addition to the first holes, also affects the second holes 113, so as to facilitate the penetration of the thermoplastic or thermosetting or expandable material in direct contact with the nonrigid sock or upper 101 until it practically surrounds the foot except for the region in which the cavity 110 is formed.

It is also subsequently possible to apply the additional phases described above, and therefore the coupling of a tread 112a and 112b with the optional interposition at the semifinished item 111 of flexible material, such as a foamed or an expandable polyurethane, designated by the reference numeral 114, by means of a second injection.

Flexible material 114 thus allows to cushion impacts during walking, increasing the comfort of the user.

Figure 6:
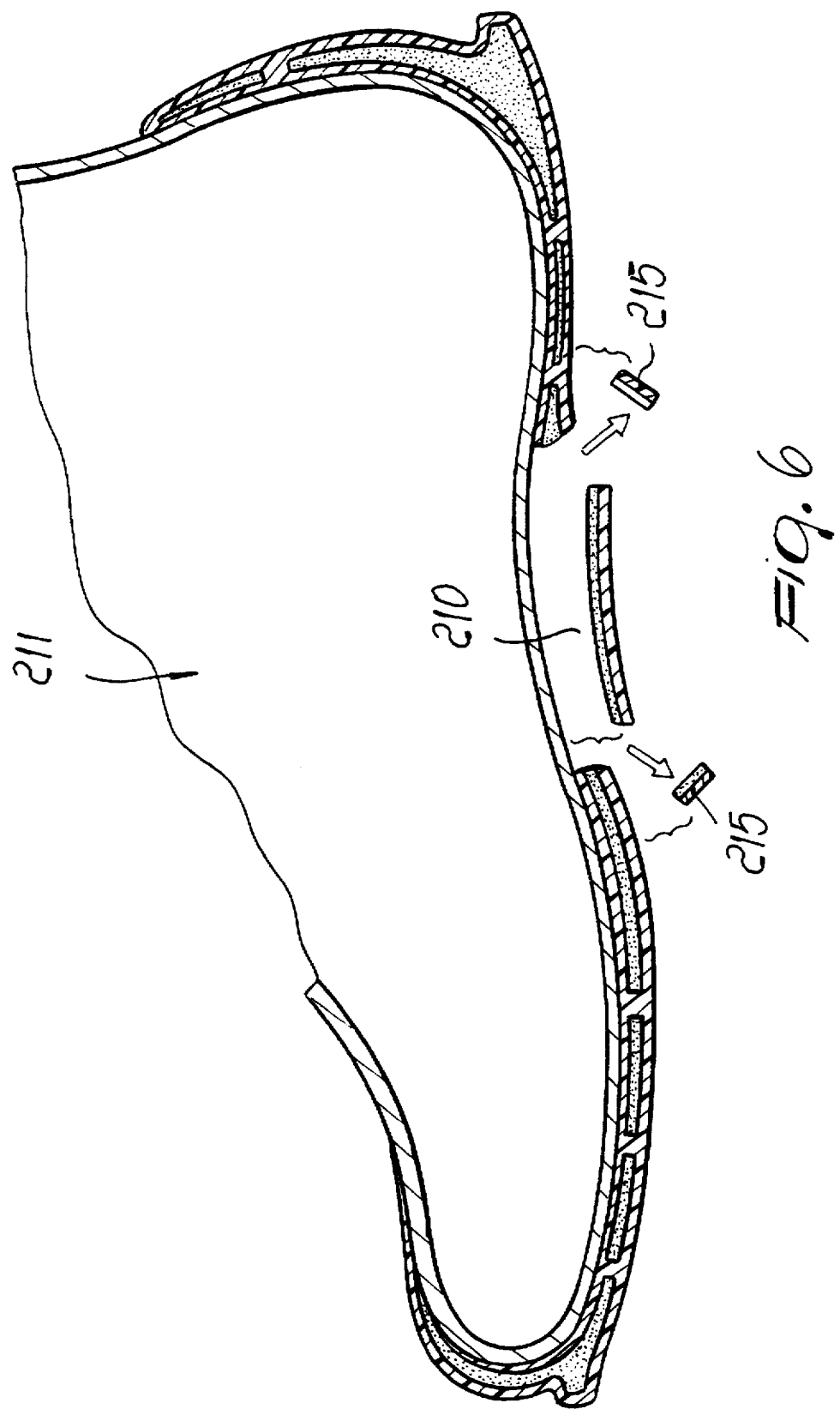
FIG. 6 is a view, similar to FIG. 5, of still a further embodiment of the invention.
Figure 7:
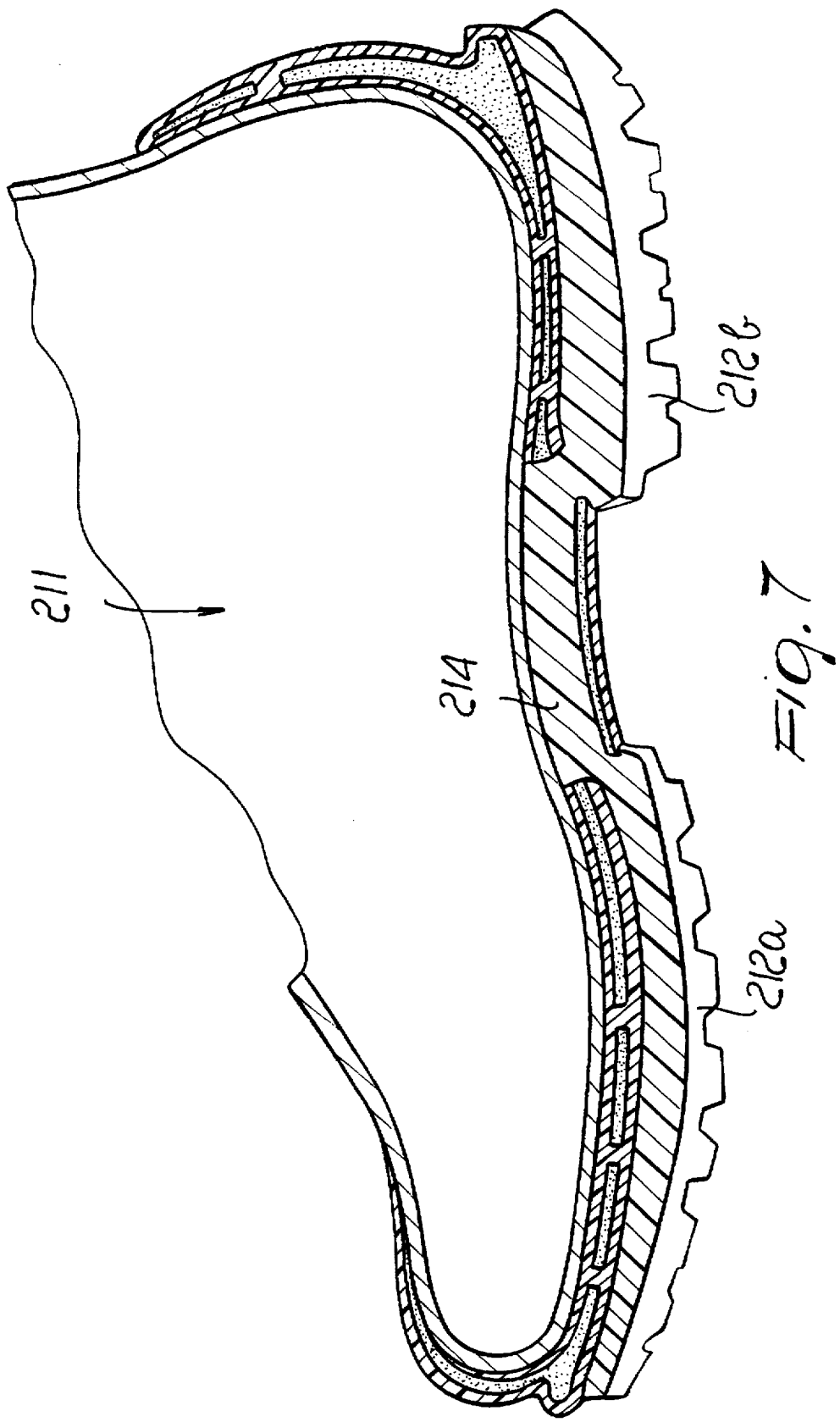
FIG. 7 is a view, similar to the preceding one, of still a further embodiment of the invention.

In another embodiment, shown in FIGS. 6 and 7, the process entails, after obtaining the semifinished item 211, the removal, for example by cutting, of one or more walls 215 that form the cavity 210. The semifinished item 211 is then arranged inside a mold to perform a second injection of flexible material, such as for example foamed or expandable polyurethane, designated by the reference numeral 214, which affects not only the lower regions of the heel and of the toe but also the cavity 210; this is done to further increase the user comfort.

Then, by means of a gluing operation, or prior to the second injection, it is possible to apply the treads 212a and 212b below the flexible material 214. In the second case, the injection of flexible material 214 rigidly couples treads 212a and 212b to semifinished item 211.

In these solutions, too, the method is highly industrialized, with considerable limitation of manual operations, and this allows to achieve a high reduction in production costs, both by virtue of the mechanization of many operations and by virtue of the lower use of expendable materials, such as adhesives and small metal parts, required in the prior art methods for connecting the various components.

The finished product also has a high quality level which is constant in time. Furthermore, precise and infinitely repeatable anatomical shapes can be obtained.

The considerable reduction of the number of stitches is extremely important. None of the stitches is visible, at least in the lateral and lower regions that are adjacent to the sole and in contact with the ground, since they are embedded in the thermoplastic or thermosetting or expandable material during injection or pouring.

A reduction in the number of manual operations also leads to optimal waterproofing of the shoe and good warmth thereof, since there is no discontinuity on the outer surface of the upper, as it happens in conventional shoes because of the stitch holes.

The user comfort is considerably improved, because the materials used for the intermediate member and for the subsequent injections or castings are not in direct contact with the foot and are located outside the nonrigid sock or upper.

Figure 8:
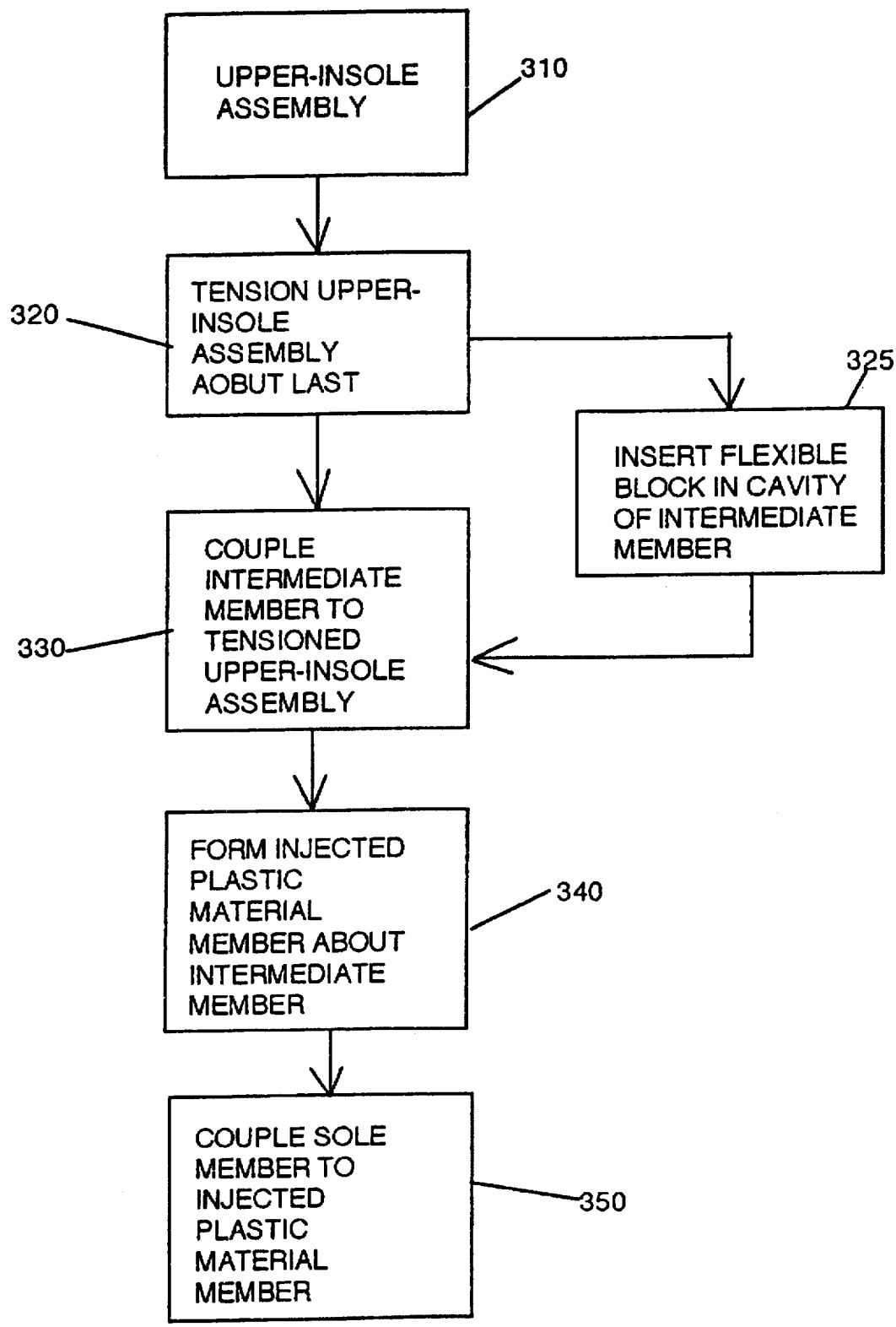
FIG. 8 is a flow diagram illustrating steps of a preferred embodiment of the method according to the invention.

FIG. 8 shows a flow diagram illustrating the steps the method according to the invention. In a first step 310 the upper-insole assembly is provided, and in a second step 320 the upper-insole assembly is tensioned about a last. In a subsequent step 330, the intermediate member is coupled to the bottom portion of the upper-insole assembly tensioned about the last, while the reference numeral 325 indicates the alternative step in which the flexible block element is inserted in the cavity of the intermediate member as previously described. In the subsequent step 340, the injected plastic material member is formed about the intermediate member, and a sole member may be coupled in step 350 to the bottom of the injected plastic material member, in any one of the manners as previously described.

The materials may of course also be the most suitable according to the specific requirements.

What is claimed is:

1. A method of manufacturing a shoe item, comprising the steps of:

arranging an upper-insole assembly about a last;

coupling an intermediate member comprising a toe portion and a heel portion to a lower region of said upper-insole assembly arranged about said last;

arranging said intermediate member in a mold and introducing plastic material into said mold so as to form an injected plastic material member which surrounds said intermediate member and which is integrally connected with both said intermediate member and said upper-insole assembly.

2. The method of claim 1 wherein the step of coupling an intermediate member to said upper-insole assembly comprises coupling a pre-formed intermediate member comprising a toe portion and a heel portion to a lower region of said upper-insole assembly arranged about said last;

and wherein the step of coupling said intermediate member to said upper-insole assembly comprises coupling said pre-formed intermediate member to said lower region of said upper-insole assembly arranged about said last such that said pre-formed intermediate member is shaped so as to sufficiently remain in position without gluing and coupled to said lower region of said upper-insole assembly during the subsequent step of arranging said pre-formed intermediate member in said mold and introducing plastic material into said mold;

and wherein the step of coupling said pre-formed intermediate member comprises coupling said intermediate member having a plurality of first holes formed at a lateral surface of said intermediate member at said toe portion and said heel portion and a plurality of second holes formed at a sole region of said intermediate member, and wherein the step of arranging said intermediate member in a mold and introducing plastic material comprises arranging said intermediate member in said mold and introducing plastic material into said mold such that said plastic material penetrates into said first holes and said second holes and contacts a surface of said upper-insole assembly at said first holes and said second holes for coupling said injected plastic material member and said intermediate member to said upper-insole assembly;

and further comprising the step of coupling a sole member to said injected plastic material member by means of thermoplastic material injection.

3. A method of manufacturing a shoe item, comprising the steps of:

arranging an upper-insole assembly on a last and tensioning said upper-insole assembly about said last;

coupling an intermediate member comprising a toe portion and a heel portion mutually interconnected by a central portion to a lower region of said upper-insole assembly tensioned about said last;

arranging said intermediate member in a mold and introducing plastic material into said mold so as to form an injected plastic material member which surrounds said intermediate member and which is integrally connected with both said intermediate member and said upper-insole assembly.

4. The method of claim 3 further comprising the step of coupling a sole member to said injected plastic material member.

5. The method of claim 4 including coupling said sole member to said injected plastic material member by means of thermoplastic material injection.

6. The method of claim 4 including coupling a sole member having two separate tread portions to said injected plastic material member respectively below said heel portion and said toe portion of said intermediate member.

7. The method of claim 4 further comprising the step of interposing flexible material between said sole member and said injected plastic material member.

8. The method of claim 4 including coupling a roller skate sole member to said injected plastic material member.

9. The method of claim 3 wherein the step of coupling an intermediate member comprises coupling an intermediate member having a plurality of first holes formed at a lateral surface of said intermediate member at said toe portion and said heel portion.

10. The method of claim 9 wherein the step of arranging said intermediate member in a mold and introducing plastic material comprises arranging said intermediate member in said mold and introducing plastic material into said mold such that said plastic material overlaps said intermediate member and penetrates into said first holes and contacts a surface of said upper-insole assembly at said plurality of first holes for coupling said injected plastic material member and said intermediate member to said upper-insole assembly.

11. The method of claim 9 wherein the step of coupling said intermediate member comprises coupling said intermediate member further having a plurality of second holes formed at a sole region of said intermediate member.

12. The method of claim 11 wherein the step of arranging said intermediate member in a mold and introducing plastic material comprises arranging said intermediate member in said mold and introducing plastic material into said mold such that said plastic material penetrates into said first holes and said second holes and contacts a surface of said upper-insole assembly at said first holes and said second holes for coupling said injected plastic material member and said intermediate member to said upper-insole assembly.

13. The method of claim 3 wherein the step of coupling an intermediate member comprises coupling an intermediate member having at least one protrusion protruding at a plantar arch region beyond a lower edge of said intermediate member and forming at least one cavity below said lower region of said upper-insole assembly.

14. The method of claim 13 further comprising inserting a flexible block element in said at least one cavity below said lower region of said upper-insole assembly.

15. The method of claim 13 further comprising the step of removing one or more wall portions of said intermediate member forming at least one cavity below said lower region of said upper-insole assembly.

16. The method of claim 15 further comprising the step of interposing flexible material between said sole member and said injected plastic material member such that said flexible material is introduced into said at least one cavity through said removed wall portions.

17. The method of claim 3 wherein the step of coupling an intermediate member to said upper-insole assembly comprises coupling a pre-formed intermediate member comprising a toe portion and a heel portion mutually interconnected by a central portion to a lower region of said upper-insole assembly tensioned about said last.

18. The method of claim 17 wherein the step of coupling said intermediate member to said upper-insole assembly comprises coupling said pre-formed intermediate member to said lower region of said upper-insole assembly tensioned about said last such that said pre-formed intermediate member is shaped so as to sufficiently remain in position without gluing and coupled to said lower region of said upper-insole assembly during the subsequent step of arranging said pre-formed intermediate member in said mold and introducing plastic material into said mold.

19. The method of claim 18 wherein the step of coupling said pre-formed intermediate member comprises coupling said intermediate member having a plurality of first holes formed at a lateral surface of said intermediate member at said toe portion and said heel portion and a plurality of second holes formed at a sole region of said intermediate member, and wherein the step of arranging said intermediate member in a mold and introducing plastic material comprises arranging said intermediate member in said mold and introducing plastic material into said mold such that said plastic material penetrates into said first holes and said second holes and contacts a surface of said upper-insole assembly at said first holes and said second holes for coupling said injected plastic material member and said intermediate member to said upper-insole assembly.

20. The method of claim 19 further comprising the step of coupling a sole member to said injected plastic material member by means of thermoplastic material injection.

* * * * *